M. CAROLUS.
SUSPENSION INSULATOR.
APPLICATION FILED SEPT. 29, 1921.
1,398,937. Patented Nov. 29, 1921.
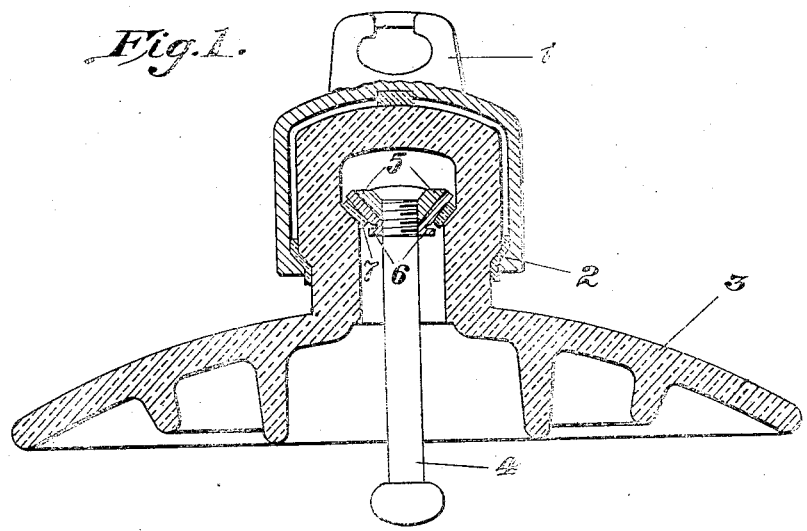
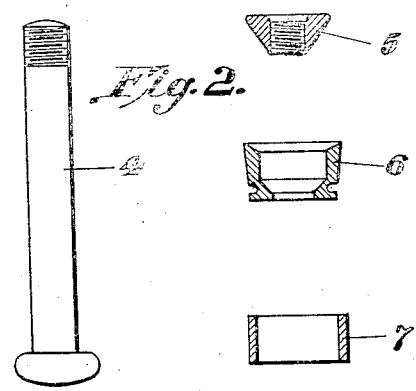
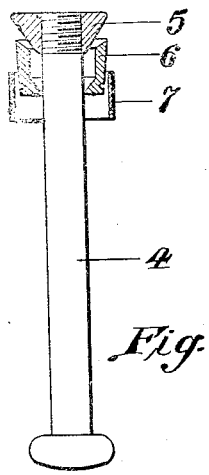
Inventor:
Max Carolus.
By Knight Bros
Attys

UNITED STATES PATENT OFFICE.

MAX CAROLUS, OF TELTOW, NEAR BERLIN, GERMANY.

SUSPENSION-INSULATOR.

1,398,937.

Specification of Letters Patent. Patented Nov. 29, 1921.

Application filed September 29, 1921. Serial No. 504,243.

*To all whom it may concern:*

Be it known that I, MAX CAROLUS, residing at Teltow, bei Berlin, Germany, have invented certain new and useful Improvements in Suspension-Insulators, of which the following is a specification.

This invention relates to suspension insulators in which no separation of the suspension members takes place when the insulating body, which is closed at the top, is destroyed, so that the line held by the insulator is prevented from dropping.

The invention is illustrated in the drawing in which—

Figure 1 is a section through a finished insulator.

Fig. 2 illustrates the elements of the suspension member, and

Fig. 3 shows the elements of the suspension member assembled.

As shown in Fig. 1 the insulator comprises a supporting cap 1 of a known kind, an inserted ring 2 made of yielding material, and an insulating body 3 having a closed head with a cavity that flares inward.

The elements of the suspension members are a suspension bolt 4 with a knob at one end and a screw thread at the other; a truncated cone 5 adapted to be screwed, riveted or welded onto the said bolt; a closed metal collar 6; and a collar 7 of yielding material.

The parts 4, 5, 6 and 7 are assembled in the manner shown in Fig. 3 and then pushed through the neck of the insulating body into its interior cavity, the ring 7 of yielding material being slipped onto the closed metal collar 6 by the application of a slight pressure. The parts inserted in this way are then put into a pulling device of a special kind and subjected to a pull several times greater than its service load, for example a pull of about 6000 kilograms. The pull applied to the knob of the bolt 4 and acting through the cone 5 on the closed collar 6 and the ring 7 encircling it, has the effect of expanding or widening the collar 6 and ring 7 in such a manner that the bolt 4, together with the conical head 5 and the collar 6 and ring 7 cannot be withdrawn from the cavity in the head of the insulator. The ring 7 of yielding material forms a washer between the metal collar 6 and the annular ledge in the cavity of the insulating body and this washer distributes the mechanical stress evenly over the said annular ledge.

In comparison with known types of cementless suspension insulators, in which a number of individual parts have to be inserted into the insulating body for the purpose of fixing the bolt, my novel insulator, in addition to its simplicity and reliability in use, offers the advantage that the distribution of the electric field through the closed metal ring is more uniform and non-uniform brush discharges in the interior of the insulating body are not so likely to occur. Besides the closed metal ring affords a much greater security against breakage than is attained in the known type of suspension insulators.

I claim:—

1. In a suspension insulator an insulating body with a head formed with a cavity therein, a supporting ledge in said cavity, a bolt, a conical head on said bolt, a malleable metal ring adapted to be slipped over said bolt and to be expanded by the conical head and pressed against said supporting ledge throughout its periphery so as to prevent said conical head from leaving said cavity, said ring being contracted at its lower edge to engage said bolt, said ring being provided with a circumferentially weakened area adjacent said contracted end, whereby during expansion said ring will bend at its predetermined line of weakness.

2. In a suspension insulator; an insulating body with a head provided with a cavity therein; a supporting ledge in the said cavity; a bolt; a conical head on the bolt; a metal ring adapted to be slipped over the bolt and to be expanded by the conical head and pressed throughout its periphery against the said supporting ledge so as to prevent the conical head from leaving the said cavity when a pull considerably greater than the load to be carried by the insulator is applied to the said bolt; and a washer of yielding mateiral forced upon said metal ring and adapted to be tensioned by said ring when said ring is expanded.

3. In a suspension insulator; an insulating body with a hollow head and a neck smaller in diameter than the head; a supporting cap enveloping the said head and having a constricted annular edge engaging with the said neck; an annular supporting ledge within the hollow of the said head; and a link comprising a bolt formed with a knob at one end and having a flaring head at its other end that tapers inwardly in the direction toward the said knob; the said flaring head consisting of a conical member, a malleable metal ring adapted to be expanded by the conical member and pressed against the said annular supporting ledge when a pull considerably greater than the service load of the insulator is applied to the bolt so as to prevent the flaring head of the bolt from leaving the hollow head of the insulator, and a washer of yielding material forced upon said metal ring and adapted to be stretched around said ring when said ring is expanded, said ring and washer engaging said ledge throughout their entire periphery.

In testimony whereof I have signed this specification in the presence of two witnesses.

MAX CAROLUS.

Witnesses:
 MAX SCHULTE,
 ADOLF DAULMADT.